United States Patent [19]
Yokota et al.

[11] 3,947,884
[45] Mar. 30, 1976

[54] TAPE RECORDER

[75] Inventors: Tadashi Yokota; Chiaki Yanagi; Toyoji Hara, all of Toda, Japan

[73] Assignee: Clarion Co., Ltd., Tokyo, Japan

[22] Filed: Oct. 2, 1973

[21] Appl. No.: 402,709

[30] Foreign Application Priority Data
Oct. 4, 1972   Japan........................ 47-114561[U]
Oct. 13, 1972  Japan........................ 47-117704[U]
Jan. 16, 1973  Japan........................ 48-7244

[52] U.S. Cl. ..................... 360/96; 360/60; 360/61; 360/105
[51] Int. Cl.²              G11B 15/18; G11B 15/04; G11B 21/02; G11B 15/02
[58] Field of Search ........... 360/60, 61, 62, 96, 105

[56] References Cited
UNITED STATES PATENTS

| | | | |
|---|---|---|---|
| 3,669,456 | 6/1972 | Oteki | 360/96 |
| 3,729,202 | 4/1973 | Wakabayashi | 360/96 |
| 3,752,486 | 8/1973 | Nakamura | 360/60 |
| 3,758,119 | 9/1973 | Harlan | 360/96 |
| 3,759,529 | 9/1973 | Yoshii | 360/96 |
| 3,785,658 | 1/1974 | Ikeda | 360/60 |

*Primary Examiner*—Robert S. Tupper
*Attorney, Agent, or Firm*—William A. Drucker

[57] ABSTRACT

A tape recorder in which the middle part of a locking lever which engages and disengages with the engaging part of a slide piece provided on the recorder frame and the end of a suspending piece are loosely pivoted to the moving frame of which one end is pivotally attached to the deck of the recorder frame, a projection which engages with one end of said suspending piece as well as with the engaging portion formed on the moving frame is provided at the end of said locking lever, a toggle spring is hooked between said suspending piece and moving frame thereby forming a guide portion, and wherein a cassette is inserted with its reproduce side or longer side inward requiring only a short stroke to automatically assume a reproducing or recording condition, and allowing easy removal of the cassette.

9 Claims, 13 Drawing Figures

TAPE RECORDER

BACKGROUND OF THE INVENTION

This invention relates to the contrivance of a tape recorder, and especially to a tape recorder of the cassette type, in which a tape pack, i.e., cassette, is inserted into the driving shafts provided on the recorder frame through the front side of said recorder frame, and the reels mounted on said cassette are fitted to said driving shaft to drive the tape, thereby allowing smooth loading of cassette with shorter stroke, as well as allowing stably loaded state of the cassette.

Cassettes used in tape recorders may be divided into those of the so-called lear-jet type in which the tape is wound on the reel in an endless manner to feed the tape to the front of the head and thereby taking up the tape withdrawn from the innermost part of the tape layer onto the outermost layer, and those of the so-called cassette type having two reels in a tape pack, running the tape between these two reels, withdrawing the tape from the reel by driving the other reel and, at the same time, winding the tape thereof to obtain tape running. By the way, regarding the cassettes of the latter type, provision of the driving shafts are required for the above-mentioned two reels. And in those miniaturized tape recorders, especially those types designed to be installed in the cab of automobiles and other vehicles, it is a modern trend to insert the cassette in the front side of the tape recorder horizontally or maintaining nearly a horizontal state, thereby enabling engagement and disengagement of the driving shaft, and thereby allowing for the cassette to assume a stable reproducing condition by utilizing the motion at the time of pushing in the cassette. However, with the earlier devices, the force at the time of inserting or loading the cassette is consumed for fitting the driving shaft to the reel of cassette, and moving the moving frame, slide member, and all other springs related and other related members for stably holding the cassette to the reproducing condition; hence insertion of the cassette requires a considerable force. Especially, miniaturized cassette makes its smooth loading rather difficult, and the loading at the time of establishing a reproducing condition, i.e., at the last moment of cassette loading, lacks smoothness.

SUMMARY OF THE INVENTION

It is therefore an object of this invention to remove the above-mentioned disadvantages and drawbacks inherent to the earlier tape recorders. That is, the principal object of this invention is to establish the reproducing or recording condition requiring only a short insertion or loading stroke of the cassette and allowing smooth insertion of the cassette, as well. For this purpose, this invention provides a cassette loading mechanism utilizing the reproduce side and the stepped portion formed on the reproduce side of the cassette, and more concretely, employing a suspending piece which engages with said reproduce side and the stepped portion, aiding to desirable changing operation. As has been commonly known, the cassette of which size being minimized and thinned has a thicker portion on the reproduce side over the areas where the head and pinch roller come into engagement to give pressure to the tape; hence a step has been formed between such a thickened portion and the thin portion. According to this invention, it is intended to perform easy loading of the cassette by utilizing such a reproduce side and the stepped portion. As has been known, such a reproduce side occupies the longer side of the cassette; hence loading stroke may be shortened greatly. And the mechanism can be made up relatively compact, allowing reliable cassette loading.

Another object of this invention is to establish a reproducing or recording condition by automatically pulling the cassette sufficiently into the tape recorder frame through the door provided at the front of the tape recorder housing utilizing a short loading stroke of the cassette, and to establish a removable state by automatically pulling the cassette out of the reproducing or recording position simply by opening the door of said recorder housing with one operation.

By setting up as mentioned above, the substantial operation by the operator requires only a small range where the cassette has been protruding sufficiently out of the recorder housing; insertion and removal of the cassette are very easy. Hence in spite of a small sized cassette, no difficulty is presented, and in addition, the cassette being inserted assumes a stable condition in the tape recorder, allowing reliable reproduction or recording.

A further object of this invention is to press the tape onto the reproduce side of the cassette by pressing the head and pinch roller toward the reproduce side of the cassette by utilizing the cassette which has been fallen onto the recording or reproduce position, thereby establishing a recording or reproducing relation.

Accordingly, the aimed recording or reproducing condition can be effected only by the initial cassette loading operation.

Yet another object of this invention is to return the cassette which has been in the recording or reproducing condition back to an easily removable state by a single operation by means of an eject piece provided on the recorder frame. For this purpose, this invention provides a special engaging resilient piece for the eject piece, in order to pull back the suspending piece which has secured the insertion of the cassette during the returning stroke of the eject piece and to release the engagement of the engaging resilient piece from the suspending piece at the final stroke. By doing so, the cassette which has been in the reproducing or recording position can be easily pulled out by utilizing a simple operation - pushing in of eject piece.

A still further object of this invention is to provide a new tape recorder which can start its operation always maintaining a definite tape feeding direction and having the above-mentioned features. For this purpose, a control part of the tape-feed changing means is plungeably provided on the moving area of the slide piece that will be actuated by the eject piece. With the control part of the tape-feed changing means being protruding onto the moving area of the slide piece, and by moving the eject piece and slide piece, said tape-feed changing means is returned. That is, with the eject piece having been operated, the tape-feed changing means assumes a constant state, so that the tape is fed in a definite direction.

Yet further object of this invention is not to create a recording condition during the tape reproduction or tape rewinding. For this purpose, this invention provides a special locking means on the recording lever which establishes a recording condition, and locks the recording lever by means of this locking means when the tape is being reproduced or rewound. An electric circuit is also provided, which allows the recording only when the tape is being fed in the forward direction. By such a setup, erroneous recording can be prevented completely, and proper recording can be always permitted.

Many other excellent technical advantage and concrete effects would become apparent by the following description of embodiment.

BRIEF DESCRIPTION OF THE DRAWINGS

The drawings show embodiments of this invention, in which.

Figure 1:
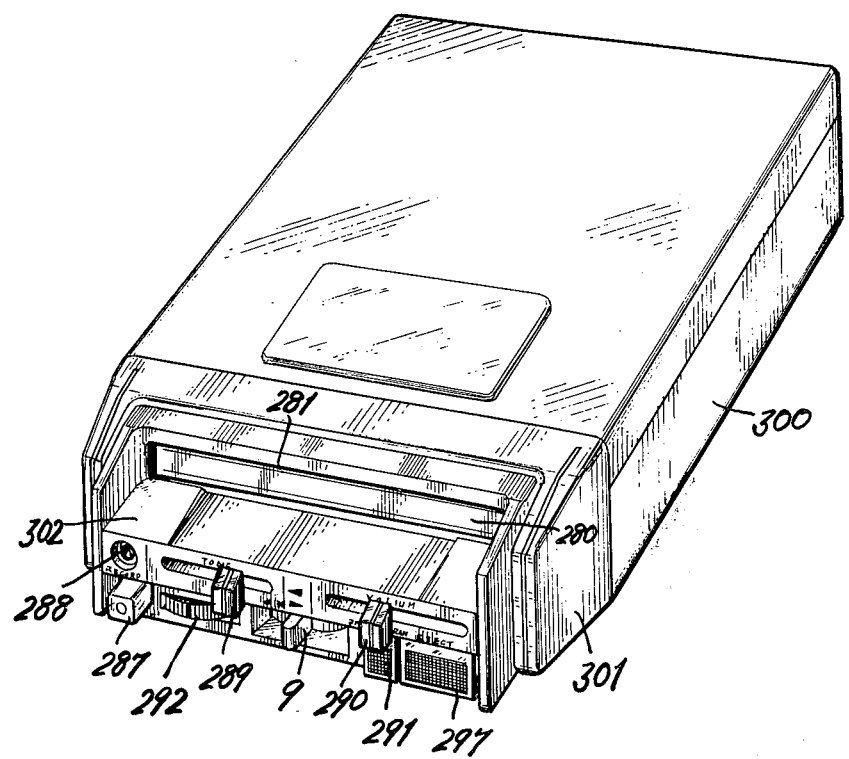
FIG. 1 is a perspective view showing the appearance of the tape recorder which is one of the embodiments of this invention.
Figure 2:
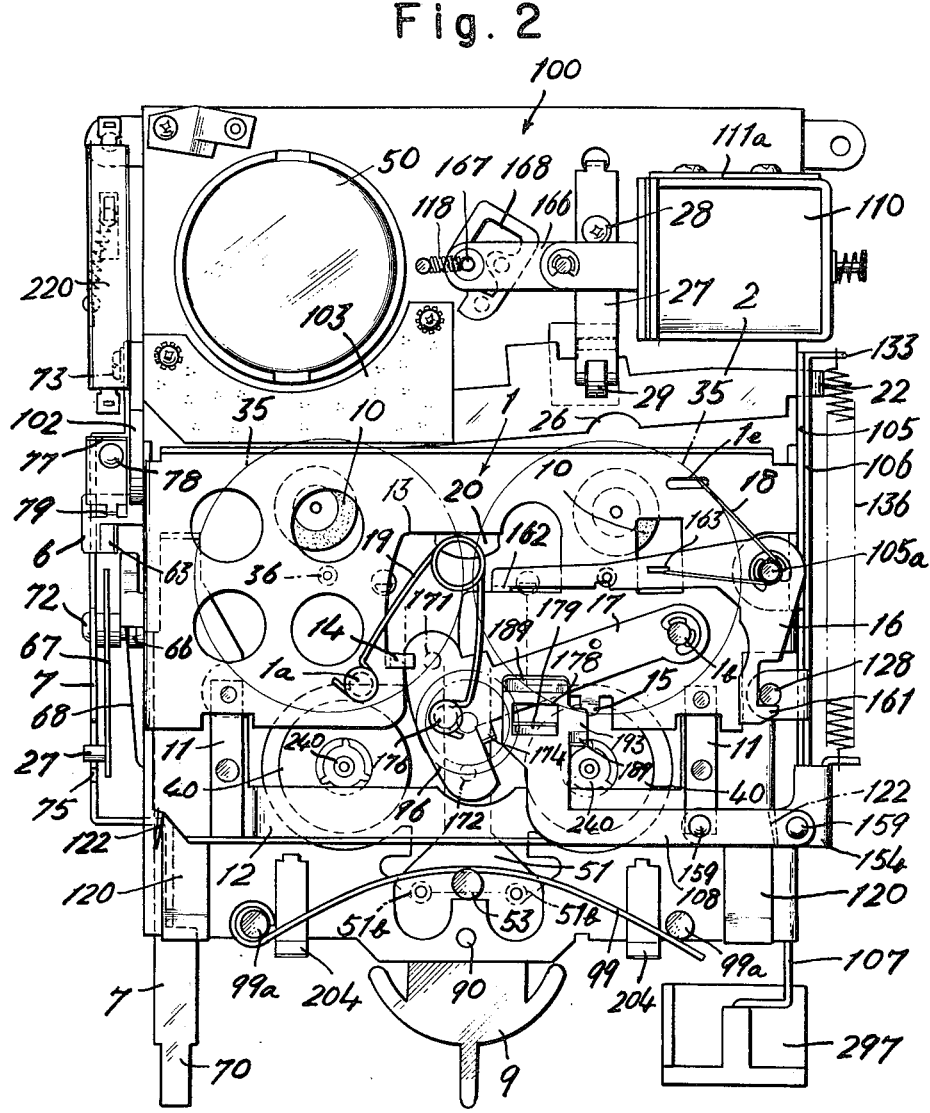
FIG. 2 is a plan view before the cassette is loaded, with the housing being removed.
Figure 3:
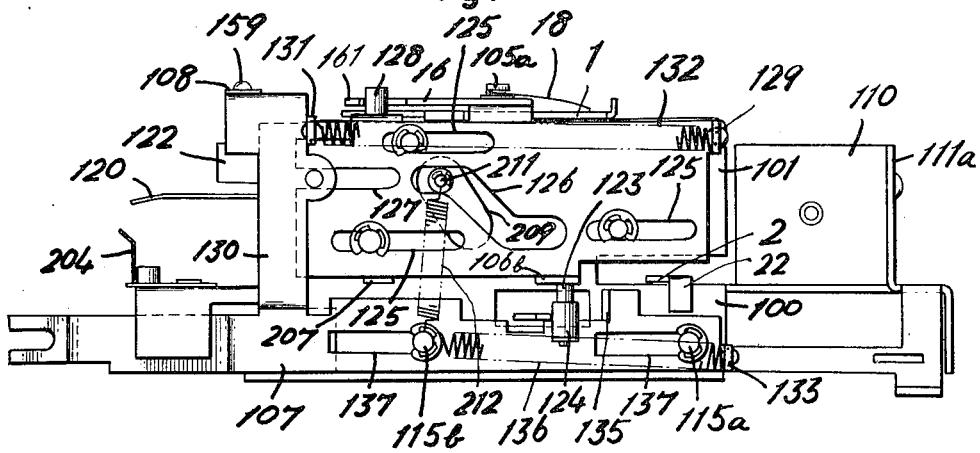
FIG. 3 is a side view as viewed from the right side in FIG. 2.
Figure 4:
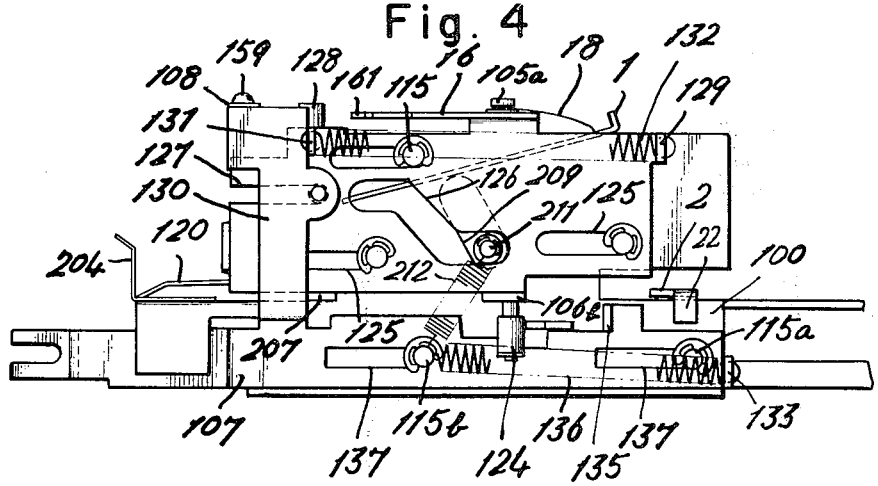
FIG. 4 is a side view where the cassette is loaded in the state of FIG. 3, and the moving frame has been lowered down.
Figure 5:
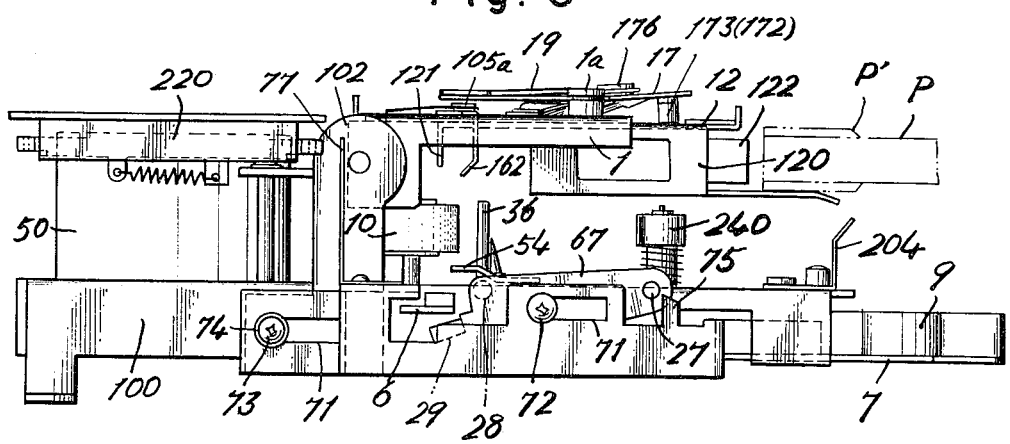
FIG. 5 is a side view as viewed from the left side in FIG. 2.
Figure 8:
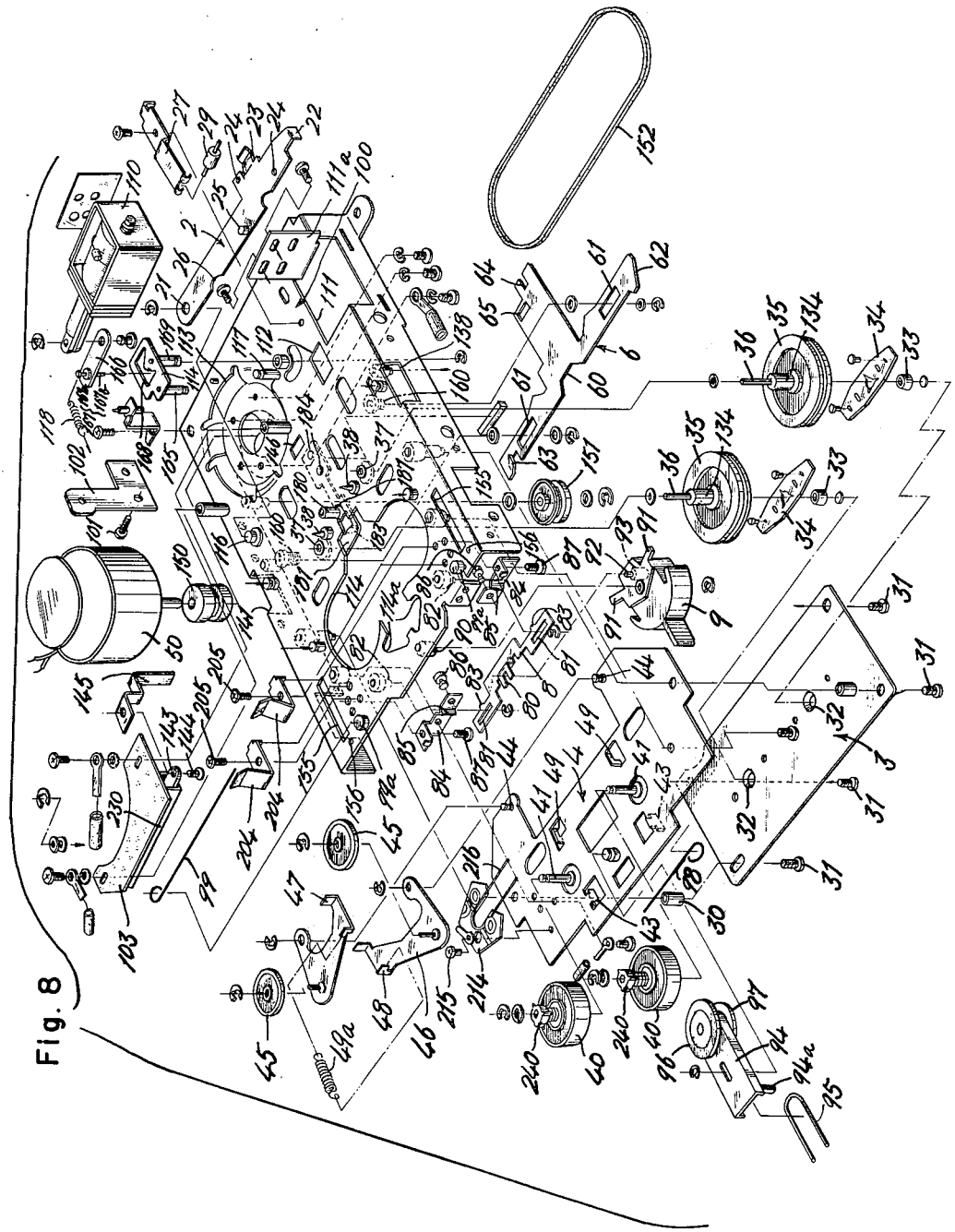
FIG. 8 is a perspective view showing the disassembled state of the constituent parts which will be arranged on the deck.

DETAILED DESCRIPTION OF THE INVENTION:

The invention is illustrated below with reference to the above-mentioned accompanying drawings. FIG. 1 is a perspective view showing a general appearance, in which the tape recorder housing 300 assumes a square shape having a front frame 301 in front. Said front frame 301 forms a step 302 at the middle portion. And above the step 302 has been formed a cassette insertion port 281 having a dust-tight door 280. The side protruding toward the front and below said middle step 302 is a control member panel having, from one side, a recording lever control 287, indicator lamp 288, tone control 289, tape-feed changing member 9, volume control 290, 291, and eject control 297. The inner construction, having removed the housing 300 and front frame 301, is shown in FIG. 2. The deck 100 has at its both sides a relatively long support plate 105 and a short support place 102 being held by a step pin 101, and between the support plate 105 and the support place 102 is pivotally supported 104, 104, the ends of a moving frame 1. To the end of the moving frame 1 is linked a cassette guide member 12 by means of revet 200 via resilient plates 11, 11. Both side of the cassette guide member 12 are bent downward to form a cassette holding portion 120. And at the tip of the cassette holding portion 120, the cassette receiving portion 121 is bent downward to come into contact with the tip of the cassette P inserted. Said holding portion 120 in the cassette guide member 12 has guide pieces 122 of a synthetic resin at both sides as shown in FIG. 8 to receive the protrusion formed on both sides of the assette P. On the upper surface of the moving frame 1 is formed a cut 13 of which recessed portion is being bent to form an engaging step 13a. Also, on one side of the cut 13 is formed a guide portion 14 as well as a push-up step 15 at the foremost edge. On the upper surface of such a moving frame 1 are provided a locking lever 16 and a suspending piece 17. The locking lever 16 of a bell crank shape is pivotally held at its bent portion by the shaft 105a secured to the upper edge of said support plate 105 which is fastened to one side of the deck 100. One end of the locking lever 16 is forming a locking portion 161 and the other end is bent downward to form a projection 162. With the hole 163 on one side of the locking lever 16 and with the hole 1e punched on the moving frame 1 have been engaging the ends of a spring 18 held by said shaft 105a to energize the locking lever 16 counterclockwise as shown in FIG. 2. The above-mentioned suspending piece 17 is of T shape as shown, and its end is loosely pivoted by a pivot 1b to the upper surface of the moving frame 1. At both sides and on the back of the other end of the suspending piece 17 are provided a relatively long engaging piece 171 which engages with the front edge of the cassette P inserted and a relatively short engaging 172 which engages with the engaging step P' shown in FIG. 5. The engaging piece 172 has an appropriate rotor 173, and at the position near the engaging piece 172 is formed a guide portion 174 bending upward, and on the opposite engaging piece 171 side is formed a connection projection 175. Furthermore, with the projection 176 provided at the upper surface midway between said two engaging pieces 171, 172, is engaged the working end 191 of a spring 19 which is of a toggle type, and the base end 192 is rotatably held by the projection 1a attached to the upper surface of the moving frame 1. Also at the middle upper surface of the suspending piece 17 is provided a connection piece 177 that will engage with the resilient piece 108 which is attached to the eject piece 107 which will be mentioned later, at the time of removing the cassette P, (details of which will be mentioned laster.

On the outer side of said support plate 105 is provided a slide piece 106. At the front and lower side of the slide piece is formed a first projection 207 bent out outward, and at the rear and lower side is formed a second projection 106b being bent outward. The second projection 106b has a vertical shaft 123 directing downward, and said vertical shaft 123 has a rotor 124. The slide piece also has the first to third horizontal guide holes 125, 125, 125 to accept the projections 115, 115a, and guide pin 115b, which are provided on the outer side of said support plate 105.

The central part of the slide piece has the fourth sloped guide hole 126 which is aslant at its middle part. And on the forward side is also provided a horizontal cut 127 which accepts the another projection 115c of the support plate 105, and to the top edge of the slide piece 106 is attached a locking pin 128, and on the forward end is formed a spring hook 129.

Positioned at the opposite side of the spring hook 129 is also a spring hook 131 at the rising part 130 protruding upward of the efect piece 107. Between the two spring hooks 129 and 131 is expanded a pulling spring 132, and since a strong spring 136 has been expanded between the spring hook 133 at the lower end of the eject piece 107 and the guide pin 115b attached to the support plate 105, the eject piece 107 always work to pull the slide piece 106 forward. The support plate 105 has another guide pin 115d, and these guide pins 115b and 115d are inserted in the guide holes 137 and 137 of the eject piece 107 to guide the sliding action, as shown. Separately, at the upper edge near the end of the eject piece 107 is formed a hitting part 135 with which will engage an engaging portion 22 formed on one side of the changing plate 2 (mentioned later) on the deck 100.

The setup of the deck 100 on which are arranged the above-mentioned moving frame 1, changing plate 2, etc. is as shown in FIG. 8 (disassembled diagram). On one side is provided on open hole 111 formed by erecting the base plate 111a to attach an electromagnetic plunger 110, and on the other side opposite to said open hole 111 is formed an open hole 113 formed by pushing the motor-mounting place 113a downward a little to mount a motor 50. Midway between these two holes 111 and 113 is punched an opening 112 for introducing a guide portion 23 formed by bending down the middle part of said changing plate 2. Said changing plate 2 with its hole 21 is pivotally attached to the deck 100 by means of a pivot 116, and has a connection rod 25 at the center as well as projections 24, 24 and recesses 26, 26 on the back side to assure smooth sliding on the surface of the deck 100. On the forward side of said deck 100 is opened an opening 114 of a considerably large area for accepting reel driving shafts. On the upper surface of said opening 114 will be arranged a head mounting plate 5 and its interlocking plate 51 shown in FIG. 10, and on the lower side of the opening 114 will be secured a reel-shaft plate 4 having driving shafts 41, 41 to support drive rotors 40, 40 that rotate together with the reel driving part 240. To the back side and forward portion of said reel-shaft plate 4 has been secured a back plate 3 via a spacer 30 by means of screws 31. That is, between the reel-shaft plate 5 and the back plate 3 are positioned two fly-wheels 35, 35 in the space being defined by the spacer 30, maintaining a freedom of rotation by means of resilient support members 34, 34 and bearing member 33 which are provided on the supports 32, 32 formed on the back plate 3, and at the center of the fly-wheels 35, 35 are erected a capstan shaft 36. Around the pulley 150 of said motor 50, an intermediate pulley 151 attached to the back surface of the deck 100, and said fly-wheels 35, 35 is expanded a resilient belt 152, to transmit the driving force of the motor 50 to the fly-wheels 35, 35.

Figure 10:
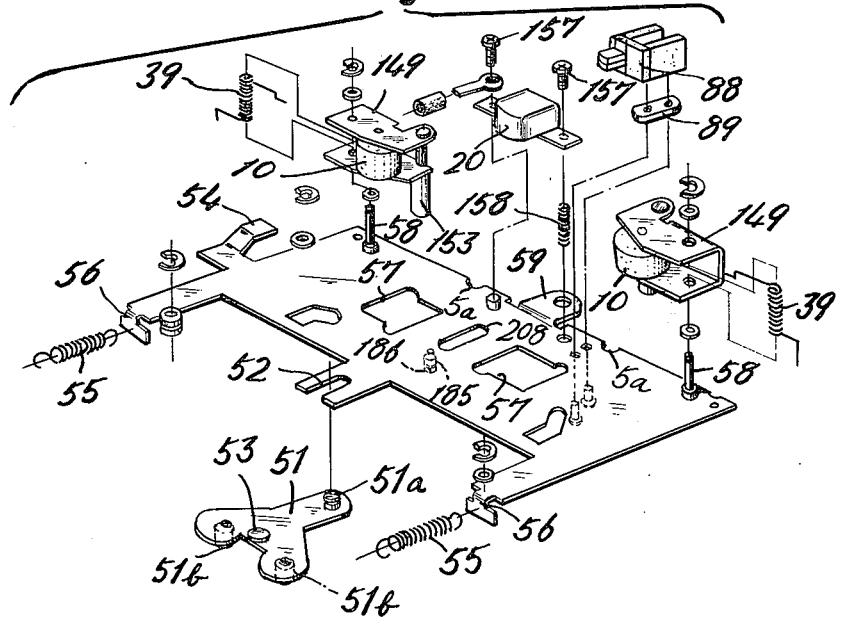
FIG. 10 is a perspective view showing the disassembled state of the head mounting plate and the constituent parts arranged around said plate.

The head mounting plate 5, as shown in FIG. 10, has spring hooks 56, 56 on both forward sides, and between these spring hooks 56, 56 and the springhooks 156, 156 at the forward side of the deck are expanded springs 55, to always urge the head plate 5 forward. The spring 55 has been positioned in the spring-placing hole 155. At the forward side of the head mounting plate 5 are provided pinch-roller attaching shafts 58 in an opposing manner and between said pinch-roller attaching shaft 58 is formed a connection part 59 which will engage with the connection rod 25 of the changing plate 2, i.e., the connection part is rotatably connected by the connection rod 25. End portions of the support frame 149 having a pinch roller 10 are rotatably supported by said attaching shaft 58, an on the attaching shaft 58 is loaded a spring 39 in such a manner that the tip of the support frame 149, i.e., the pinch roller 10 side can always be pushed forward, so that the stop rod 153 attached to said tip portion may engage with the engaging part 5a formed at the front edge of the head mounting plate 5. Furthermore, at the front central portion of the head mounting plate 5 is attached a recording and reproducing head 20, one side of which being held by a screw 157 and the other side of which being adjustable via a spring 158. Provided adjacent to the recording and reproducing head 20 is an erasing head 88 which is so positioned via a washer plate 89 that its head face is nearly in the same face as that of the recording and reproducing head 20. These heads 20, 88 and pinch rollers 10, 10 are mounted on the head mounting plate 5 to proceed and retreat in parallel with the tape running area of the cassette loaded. In order to define the proceeding position of such a head mounting plate 5 before the loading of cassette P and against the tensile force of the springs 55, 55, the end of a resilient plate 181 is secured by stop pins 184, 184 at the bottom of the deck 100 as shown in FIG. 8, and at the middle part of said resilient plate 181 is attached a projection 180 that will appropriately protrude through the extension part 187 of the opening 114 which accepts the reel driving shafts and through the opening 188 of the head mounting plate 5. Moreover, at the end of the resilient plate 181 is punched a hole 182, and at the tip side of said hole 182 is formed an engaging part 183 being bent downward, and with the engaging part 183 will detachably engage an engaging rod 185 provided at the bottom and central area of the head mounting plate 5, as shown in FIG. 10. To ease such engaging and disengaging motion, an engaging face 186 is formed on one side of the engaging rod 185. That is, with the cassette P not in a reproducing position, the above-mentioned projection 180 assumes an appropriately protruded state beyond the upper surface of the opening 188 due to the resilient force of the resilient plate 181, and the engaging face 186 of the engaging rod 185 engages with the engaging part 183 of the resilient plate 181. Hence the head mounting plate 5 is retained at the stopped position in spite of the tensile force of the springs 55, 55. In this way, the heads 20, 88 and pinch rollers 10, 10 all assume the retreated state suited for loading the cassette P. Under such a condition, the cassette P will be loaded as mentioned later, and as the reels come into engagement with the drive rotors 40, 40, the lower surface of the cassette P pressed onto the head mounting plate 5 or the deck 100 causes the projection 180 to be pushed down against the resilience of the resilient plate 181, so that the engagement between the engaging part 183 of the resilient plate 181 and the engaging rod 185 will be released. The head mounting plate 5 is then pulled out forward due to the tensile force of the springs 55, 55, and the engaging rod 185 runs into the upper surface of the resilient plate 181 (surface contacting with the bottom of the deck 100), and said heads 20, 88 and the pinch rollers 10, 10 proceed into the cassette P to come into contact with the tape, and establishes a tape feeding condition with the help of a capstan shaft 36. Also, if the eject piece 107 is pushed forward under such reproducing condition, a hitting portion 135 pushes the engaging portion 22 of the changing plate 2, and said changing plate 2 and the head mounting plate 5 are retreated together, so that the engaging rod 185 retreats to fall on the hole 182, and the resilient plate 181 restores itself to the state as to come into contact with the lower surface of the deck 100, thereby establishing again an engageable condition between the engaging surface 186 of the engaging rod 185 and the engaging part 183.

On the deck 100 are provided a pair of through holes 37 for the capstan shaft 36 and the position defining pin 38 in an opposing relation for defining the position of the cassette P, and said pairs are positioned in openings 57, 57 provided at the central areas of the head mounting plate 5. The capstan shaft 36 and the position defining pin 38 inserted in the through hole 37 are allowed to protrude through the opening 57. On the forward side of the deck 100 is mounted a change control member 9 through a pivot shaft 90, and on both sides of said change control member 9 are opposingly provided engaging projections 91, and at the back is provided a control projection 92. Also, the interlocking plate 51 engages with its engaging projection 51a provided at the tip with the guide portion 52 formed on the central forward side of the head mounting plate 5, and the projections 51b provided on both forward sides at the back come to protrude toward the back surface through the forward side extended part 114a in said hole 114 of the deck 100, and come into embracing engagement with the engaging projection 91 of said change control member 9, respectively. The projection 93 protruded at the back side in concentric with said control projection 92 is positioned in the U-shaped resilient member 95 attached to the change control piece 94 together with the projection 94a, and holds said change control piece 94 held by the pivot shaft 42 of the reel-shaft plate 4 always at a neutral position. To the end of said change control piece 94 are attached rotatably and concentrically the first rotor 96 that comes into contact with either one of the drive rotors 40, and the second rotor 97 that comes into engagement with either one of the fly-wheels 35. To the spring hooks 43, 43 protruded at the back surface of the reel-shaft plate 4 are hooked a spring 98 which is working to the projection 94a of said change control piece 94 in such a manner as to push it forward. The another spring 99 hooked to the spring hooks 99a, 99a provided at the upper surface of the deck 100 is functioning to the projection 53 provided at the middle forward side of said interlocking plate 51 to always pull said interlocking plate 51 forward. And according to the construction relating to such a change control member 9, said change control member 9 is always held at the neutral position due to the action of said U-shaped resilient member 95. By rotating such a control member 9 toward right or left to change itself toward the feed direction, the control projection 92 and the projection 93 are moved in the opposite direction, so that the change control piece 94 via the projection 93 is tilted in the direction opposite to the tilting direction of the control member 9, and engagement of either one of the projections 91, 91 and either one of the engaging projections 51b, 51b cause the guide plate 51 to be pushed forward a little, and is tilted in the same direction as that of the change control piece 94 with the engaging projection 51a as the center. Accordingly, both the first and the second rotors 96, 97 are brought into contact with either one of the fly-wheel 35 or the drive rotor 40. The rotational force of the so engaged fly-wheel is transmitted to the drive rotor 40 to perform the tape feeding. With the control projection 92 of such a change control member 9 is engaged a fork-shaped projection 20 formed at the center of the brake control piece 8 shown in FIG. 8. On both sides of the brake control piece 8 are opposingly provided long guide holes 81, for engagement with the guide pin 82 protruded from the bottom of the deck 100. At the side edge of the long guide holes 81 of the brake control piece 8 are formed control protrusions 83, respectively. With respect to these control protrusions 83 is provided a resilient plate 84 at the lower surface of the deck 100 by means of a screw 87. At the middle part of the resilient plate 84 is formed a passive protrusion 85 which instantaneously engages with the control protrusion, and at the tip of the resilient plate 84 is attached a brake member 86. Hence by effecting the abovementioned brake control piece 8 is moved toward right and left directions, and the brake member 86 is pushed out at the moment when the control protrusion 83 came into contact with the passive protrusion 85, so that braking action could be given to the periphery of the drive rotor 40 mounted on the position where the brake member 86 will be pushed out. That is, the drive rotor 40 which is rotating in one direction continues to rotate due to the rotating inertia of a series of interlocking members even when the switching operation is effected, but such a rotation due to inertia will be stopped soon by the braking action of said brake member 86 and will then get the aimed driving force.

At the forward portion of the reel-shaft plate 4 are provided two protrusions 44, 44, and to these protrusions 44, 44 are pivotally attached the base end of a moving piece 46 having a pulley 45, and at the ends of the moving piece 46 are formed a contact part 47 and a spring hook 48. Across the spring hook 48, 48 is expanded a spring 49a, and the spring hook 48 is fitted to the reel-shaft plate 4 by being held by the support portion 49 formed being bent upward at the front portion of the reel-shaft plate 4. Contact parts 47 of the so assembled moving pieces 46, 46 are faced to the recess 60 at the central side of the tape-feed changing plate 6. Said tape-feed changing plate 6 has guide holes 61 on both sides, and is attached with the guide holes 61 to the lower surface of the deck 100 by means of guide pins 160 and is slidable toward right and left directions. And at one side of the tape-feed changing plate 6 is formed a tilted edge 62, and on the other side is formed an aslant guide 63. The engaging portion 64 formed being protruded at the center of the tape-feed changing plate 6 will be engaged with an engaging rod 165 of changing operator 164 caused by the electromagnetic plunger 110. The engaging pin 167 of an interlocking piece 166 pivotally attached to the electromagnetic plunger 110 has an upper end 167a to which is hooked a spring 118 from the rod 117 secured to the deck 100, and its lower end 167b is inserted in the cam hole 168 of said changing operator 164. The changing operator 164 is rotatably supported to the shaft support 119 of the deck 100 and has, on its one side, the abovementioned engaging pin 167 that is engaging with the engaging part 64 of said tape-feed changing plate 6 at the back surface of the deck 100 through an arc hole 109 on the deck 100. In the engaging hole 65 punched through the side of the engaging portion 64 of the tape-feed changing plate 6 is inserted a vertical piece 145 fastened by a screw 144 to the change control piece 143 below the printed board 103 shown in FIG. 2, through the opening 146 of the deck 100, in order that the electric circuits for the heads 20, 88 and electric circuit for channel indication may be changed in connection with the changing operation of the abovementioned tape-feed changing plate 6. If the electromagnetic plunger 110 is operated by the detected signal such as one obtained by the tape end of the cassette being inserted, the changing operator 164 is operated via the interlocking piece 166, so that the engaging rod 165 causes the tape-feed changing plate 6 to move toward right or left; either one of the two contact parts facing the recess 60 is allowed to be positioned in the recess 60 and the other one is positioned outside the recess 60. The moving piece 46 having a contact part 47 being positioned in the recess 60 is allowed to rotate by the amount equal to the depth of the recess 60 due to the pulling force of the spring 49a with the protrusion as the center, and the pulley 45 which is in contact with the shell 134 of either one of the flywheels wheels 35 supported in the through hole 37 transmits its rotative force, while the other pulley is away from the shell 134. Also, since the pulley 45 which has proceeded to come into contact with the shell 134 is also in contact with the corresponding drive rotor 40, either one of the drive rotors 40 (one corresponding to the proceeded pulley 45 as mentioned) transmits the rotative force through the fly-wheel 35 and other drive rotor assumes the idling state, so that the drive rotor 40 receiving the rotative force will perform tape winding, i.e., tape running. And under such condition, if the electromagnetic plunger 110 is actuated, the engaging relation will be established in the opposite set, i.e., among pulley 45, drive rotor 40, and the fly-wheel shell 134, resulting in the reversed tape running direction.

Figure 6:
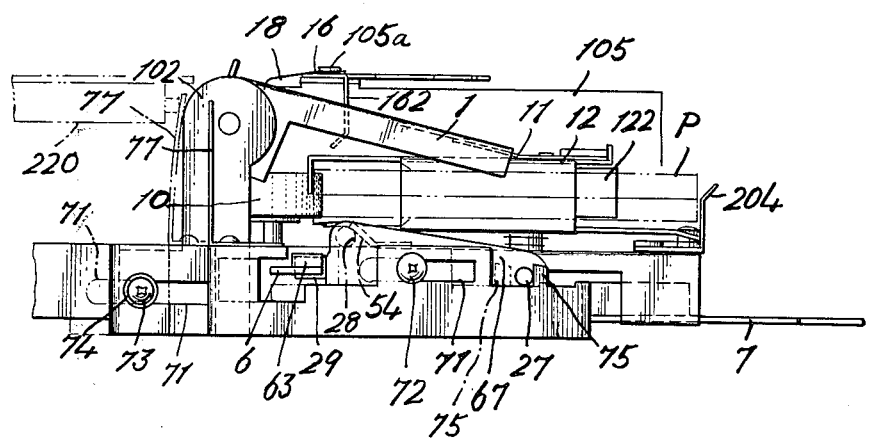
FIG. 6 is a side view as viewed from the opposite side of FIG. 4 where the cassette has been loaded in the state of FIG. 5 and the moving frame has been lowered down.
Figure 9:
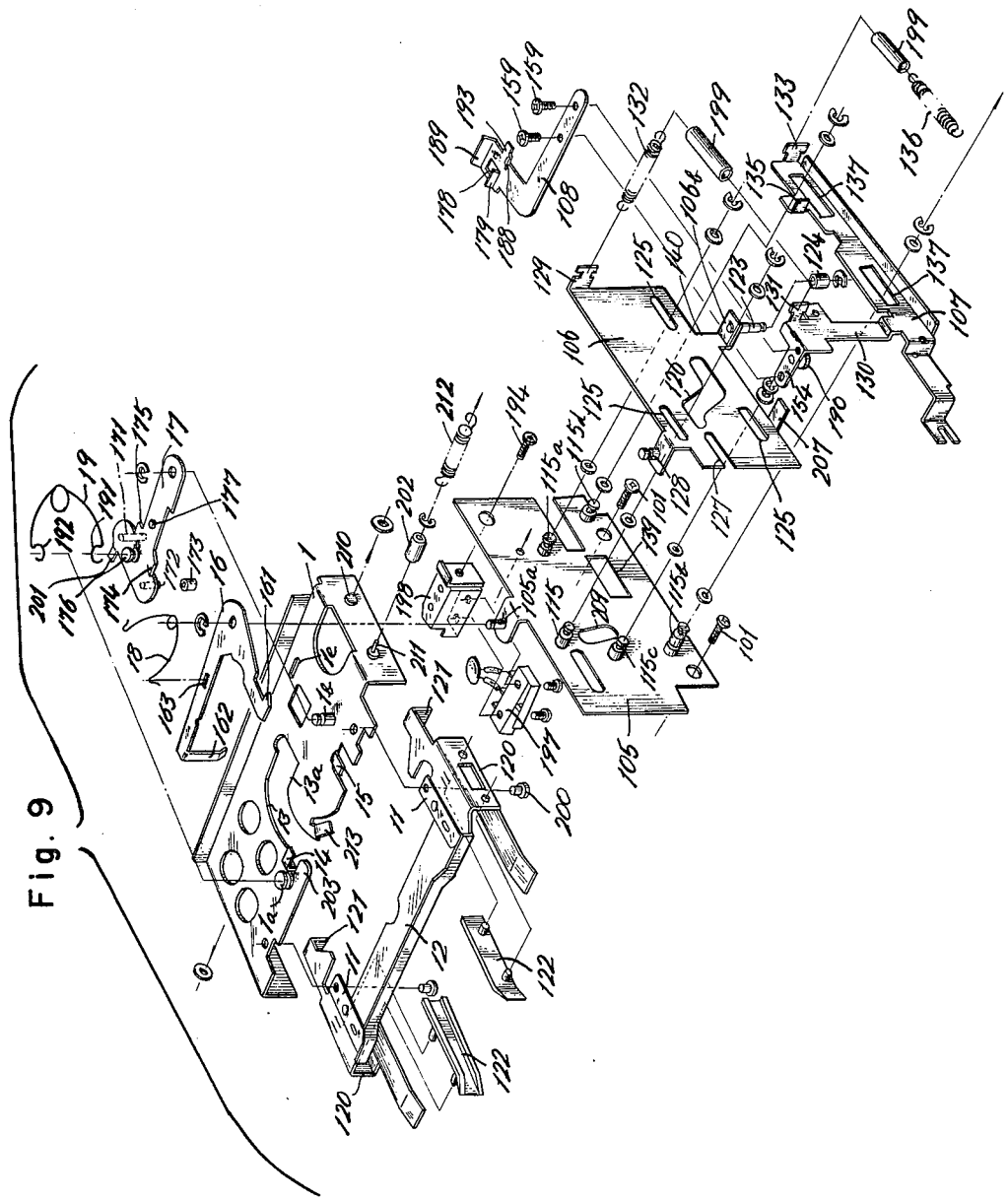
FIG. 9 is a perspective view showing the disassembled state of the support plate, slide piece and eject piece mounted on the moving frame and on the side of the deck, as well as the constituent parts arranged around said members.
Figure 11:
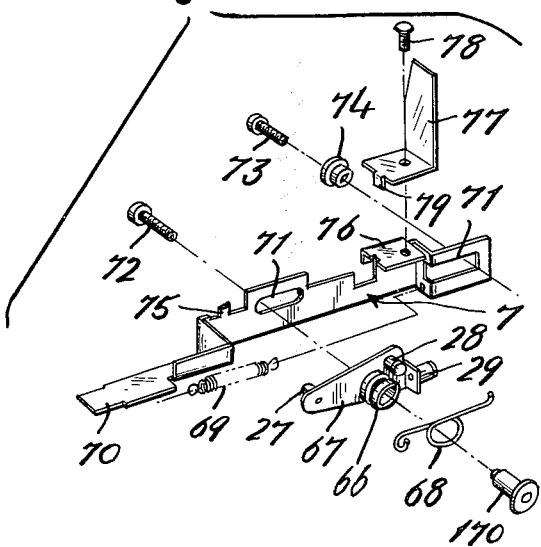
FIG. 11 is a perspective view showing the disassembled state of a recording lever and the constituent parts arranged around said lever.

When feeding the tape in the reverse direction, the tilted edge 62 of the tape-feed changing plate 6 is caused to protrude greatly from the cut 140 of the slide piece 106 via the opening 138 formed on one side of the deck 100 and the opening 139 of the support plate 105. Said slide piece 106 has a rotor 124 by means of a vertical shaft 123 at the side of the cut 140 as shown in FIG. 9. Hence by the changing operation of said tape-feed changing plate 6, when the tape is running in the reverse direction, the tilted edge 62 will protrude to the moving area of the rotor 124 due to the slide piece 106 which has forwarded being interlocked with the eject piece 107 which will be mentioned later, and said rotor 124 pushes back the tapefeed changing plate 6 to restore the forward tape feeding direction. The restoration into forward tape feeding direction by the operation of the eject piece 107 also secures that when the cassette P is withdrawn by eject piece 107 and another cassette is inserted for reproduction, the tape will start its running necessarily in the forward running direction; no attention to make sure the tape running direction just prior to starting the operation is needed. The aslant guide 63 on the other side of the tape-feed changing plate 6 is always protruding through another opening 141 provided opposite to said opening 138 of the deck 100, but its protruding degree will be changed depending on the rightward or leftward operation of the tape-feed changing plate 6. Provided through such an opening 141 is a recording lever 7 shown in FIG. 11. Said recording lever 7 is bent for its push button attaching part 70 as shown and is positioned inside the side wall 147 of the deck and is protruded outward through the cut 142 of said side wall 147. At the outer portion which slides on the side wall 147 are provided two long guide holes 71, 71 through which are penetrating the stop pins 72, 73 attached to the two side walls 147. The stop pin 72 is screwed into the shaft hole 66 of the rotary piece 67 energized, in FIGS. 5 and 6, to rotate clockwise being loaded with a spring 68 at the shaft 170. The stop pin 72 is inserted in the long guide hole 71 through fitting 74. The above-mentioned rotary piece 67 is provided with the first engaging part 27 and the second and the third engaging parts 28, 29 as shown in FIG. 11. The first engaging part 27 is detachably positioned to the locking part 75 of the recording lever 7, the second engaging part 28 is faced to the aslant guide 53 at the other side of the head mounting plate 5 shown in FIG. 9 on the deck 100, and the third engaging part 29 is releasably engaged with said aslant guide 63 of the tape-feed changing plate 6. The recording lever 7 has a mounting place 76 at its middle part. To the mounting place 76 is fastened a recording switch control piece 77 having a suitable resiliency by means of stop pin 78 and engaging part 79. And across the tip of the recording lever 7 and the spring hook 148 near the cut 142 of the deck side wall 147 is expanded a pulling spring 69. Although not shown, a recording switch is attached to the front side of said recording switch control piece 77. And with the recording switch being held at the forward position, the recording switch will be turned ON as shown by imaginary lines in FIG. 5 to effect recording.

Operation concerning the above-mentioned recording lever 7 is illustrated below. With the cassette P being removable shown in FIG. 5, the head mounting plate 5 proceeds so that the aslant guide 54 pushes down the engaging part 28. The rotary piece 67 will then be rotated counterclockwise against the resiliency of the spring 68, and under a condition, even if the recording lever 7 is pushed forward, the locking part 75 of the rotary piece 67 at the time of returning will not engage with the engaging part 27 and release the pushing force. The recording lever 7 will return immediately without establishing a recording condition. This means that with the cassette being inserted and with the reproducing condition not being established, the recording condition is then not established. Also under the condition of FIG. 6 in which the cassette P is inserted and is assuming a reproducing condition, the locking part 75 will be in engagement with the engaging part 27 of the rotary piece 67. Hence it is not allowed to push the recroding lever 7 itself; under such a condition, even if a pushing force is erroneously applied to the recording lever 7, the recording condition will not be established. In order to make recording under such reproducing condition, the change control member 9 have to be rotated toward right or left to form a changed state prior to pushing the recording lever 7. In such a case when the tape feeding is in the reverse direction, i.e., the tape-feed changing plate 6 is being moved leftward and the aslant guide 63 is pushing down the engaging part 29, the rotary piece 67 will assume the state of being rotated counterclockwise, and will not establish an engaged relation between the locking part 75 of the recording lever 7 and the engaging part 27, like the above-mentioned instance where the reproducing condition has not been assumed. Whereas, when the tape is running in the forward direction, the engaging part 27 of the rotary piece 67 will have been provided with a rotative force in the clockwise direction, and under such a condition if the change control member 9 is rotated, the guide plate 51 will be forwarded against the resilient force of the spring 99, so that the engaging protrusion 51a pushes forward the head mounting plate 5 against the resilient force of the springs 55, 55. The aslant guide 54 will then pushes down the engaging part 28 a little, thereby raising a little the engaging part 27 of the rotary piece 67 from the engaging condition with respect to the locking part 75 and forming a condition in which the recording lever 7 can be pushed in. Under such a condition, if the recording lever 7 is pushed and the pushing force to the change control member 9 is released, the guide plate 51 will return due to the resiliency of the spring 99, and the rotary piece 67 rotates counterclockwise so that the engaging part 27 is fallen down in front of the locking part 27 to be engaged, thereby interrupting the recording lever 7 from being returned and forming locked condition to establish recording condition. That is, since the recording switch can hold the state of being pushed due to the control piece 77, it is possible to effect the aimed recording. After the recording has finished, said change control member 9 may be operated to cause the interlocking plate 51 to proceed forward again, so that the head mounting plate proceeded pushes down the engaging part 28; the rotary piece 67 will then rotate counterclockwise to release the locked state of the engaging part 27 and the locking part 75, permitting the recording condition to return to the reproducing condition.

The resilient piece 108 has been secured by stop pins 159, 159 to the mounting plate 154 formed by bending horizontally the upper part of the rising part 130 of the eject piece 107, and the tip of the resilient piece 108 is bent in L-shape and has been extended toward the upper part of the moving frame 1, especially toward the push-up step 15 and the suspending piece 17 under the conditions in which the cassette can be inserted or removed as shown in FIG. 2. The resilient piece 108 has an opening 178 at its extended part as well as the two guides 179 and 189 aslant forward, and another guide 188 aslant and protruded backward via the horizontal projection 193. That is, the guides 179, 189 and opening 178 are positioned on the moving area of the engaging rod 177 of the suspening piece 17, and the guide 188 is positioned on the push-up step 15 which is formed to protrude upward on the moving frame 1. Also, to the lower surface of said mounting plate 154 has been attached a projection 190 to be in contact with the upper surface of the cassette guide member 12 connected via the above-mentioned resilient plates 11, 11 to the moving frame 1, for the purpose that when inserting or removing the cassette, the guide member 12 will guide the cassette P to the proper inserting and removing position.

Figure 7:
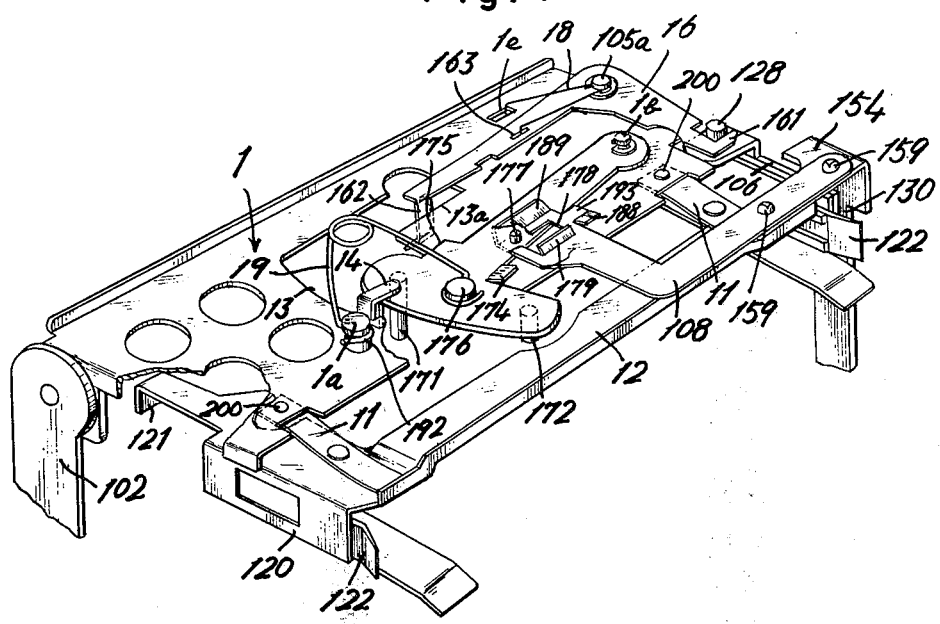
FIG. 7 is a perspective view of the moving frame portion.

Said resilient piece 108 creates sophisticated functions mainly with regard to the suspending piece 17 when removing the cassette. Under the condition of FIG. 2 where the cassette is inserted or removed, the horizontally protruding part 193 which is a base for the guide 189 is on the push-up step 15. Accordingly, at least the opening 178 and guides 179 and 189 of the resilient piece 108 are being pushed up above the surface of the suspending piece 17 and maintaining some clearance therebetween. Hence as far as such a clearance is maintained, no function will be created between the resilient piece 108 and the suspending piece 17. If now the cassette P is inserted under such condition and the moving frame 1 is fallen from the state shown in FIG. 5 to the state shown in FIG. 6, the contacting relation between said resilient piece 108 and the horizontal projection 193 is released. The suspending piece 17 is then rotated by the cassette P until stop projection 201 of the suspening piece 17 hits the back of the cut 13. If the push button 200 of eject piece 107 is pushed to restore the cassette P from the so established reproducing condition to the inserting or removing condition, the resilient piece 108 is forwarded together. On the other hand, the rising part 130 comes into contact with the engaging protrusion 207 of the slide piece 106 and causes said slide piece 106 to proceed together. Due to the slide piece 106 which has proceeded or forwarded, the rotor 202 which engages with the aslant guide hole 126 is pushed upward. The moving frame 1 is then rotated with the shaft 210 as a center thereby pulling up the rotor shaft 211 in the through hole 209 by virtue of the action of the spring 212 expanded across the rotor shaft 211 and the guide pin 115a. The suspending piece 17 is then caused to rise so that the engaging rod 177 provided thereon is positioned in the opening 178 of the resilient piece 108 which is in the advanced position. If the pushing force of the eject piece 107 is released under such condition, the eject piece 107 only is restored due to the resilience of the spring 136, and the back edge of the opening 178 being engaged with the engaging rod 177 is pulled forward. Accordingly, the suspending piece 17 is pulled back and rotated until the stop projection 201 hits the stop portion 103 protruding at the front of the cut 13. At the time when the pulling motion of the suspending piece 17 has finished, the guide 174 being guided by the aslant push-up portion 213 formed on the inlet side of the cut 13 of the moving frame 1 pushes up the engaging piece 172 of the suspending piece 17, causing said engaging piece 172 to engage with the step P' of the cassette P to be released, and at the same time, the resilient piece 108 rises with its guide 188 over the push-up step 15, and floats over the suspending piece 17, and causes the engagement between opening 178 and engaging rod 177 to be released. Also in the drawings, 204 is a resilient piece being secured firmly by a stop pin 205 at both forward sides of the deck 100 and serves to hold in place the front edge of the cassette P being inserted and lowered down on the moving frame 1. On the back of the support plate 105 is mounted a mounting member 195 by means of a stop pin 194, and on the mounting plate 198 of the mounting member 195 is mounted a power switch 197. Also the springs 132 and 136 are covered by a protection tube 199 made of a synthetic resin pipe. In FIG. 7, what is shown on the side of the reel-shaft plate 4 is a terminal plate 214 which is fastened onto the reel-shaft 4 by means of stop pin 215. A U-shaped contact piece 216 is equipped on the terminal plate 214 to hold and come into contact with the rotary portion having alternately the non-conductive portion and the conductive portion, and to detect the rotating state of said drive rotor as well as to obtain the desired signals.

Figure 12:
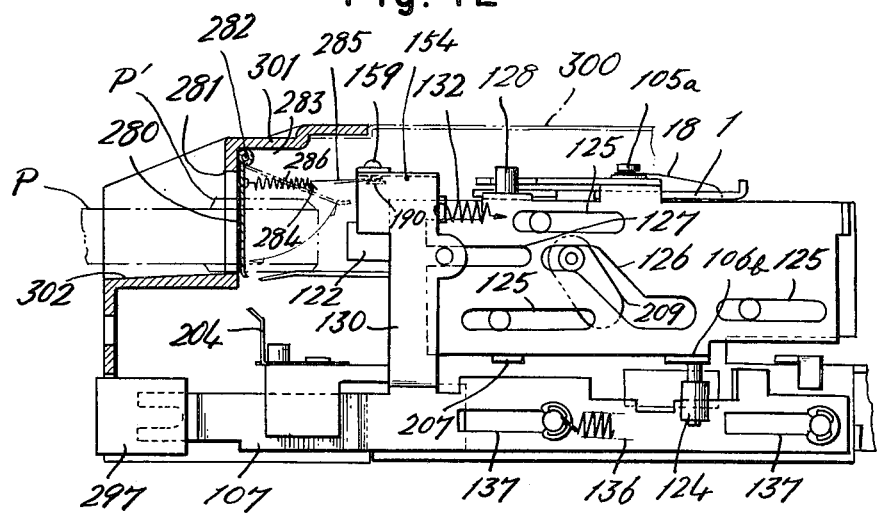
FIG. 12 is a cross-sectional view showing the disposition of the dust-tight door and the related inner constituent members in the housing of the tape recorder of this invention.

At the front frame 301 of the recorder housing 300 of this invention has been attached a dust-tight door 280 as mentioned earlier. The dust-tight door 280 is held inside the upper edge of the loading port 281 by means of pivot shaft 282 as shown in FIG. 12, and to the pivot shaft 282 has been attached a spring 183 to keep the loading port 281 always closed. If the reproduce side of the cassette P is inserted, the dust-tight door 280 is opened inward against the force of said spring 283, and the cassette is inserted freely. According to this invention, between the back and middle part of such a dust tight door 280 and the stop pin 190 attached to the mounting place 154 at the rising part 130 of said eject piece 107, is attached a spring 284, with a loose slide part 285 formed by bending the spring into U-shape on the stop pin 190 side and a bending part 286 being provided therebetween. When said dust-tight door 280 is being opened toward inside of the loading port 281, the spring 284 advances along the lower surface of the mounting plate 154 within the limit of the loose slide part 285, and then the bending part 286 is bent to allow the dust-tight door 280 to be opened almost without any resistance. On the contrary, when being closed, as the restoration force of said spring 283 closes the dust-tight door 280, the bending part 286 is extended straight, and the loose slide part 285 slides to restore the position shown. Further, when an ejecting force is being applied to the control part 297, the mounting place 154 of the rising part 130 is caused to move forward, so that the dust-tight door 280 is opened appropriately via said spring 284. By allowing the cassette P to rise up from the reproducing position with the dust-tight door 280 being opened a little, said dust-tight door 280 can be opened up to the position shown by imaginary lines or better as shown, thus smoothly establishing the condition in which cassette P can be removed.

Figure 13:
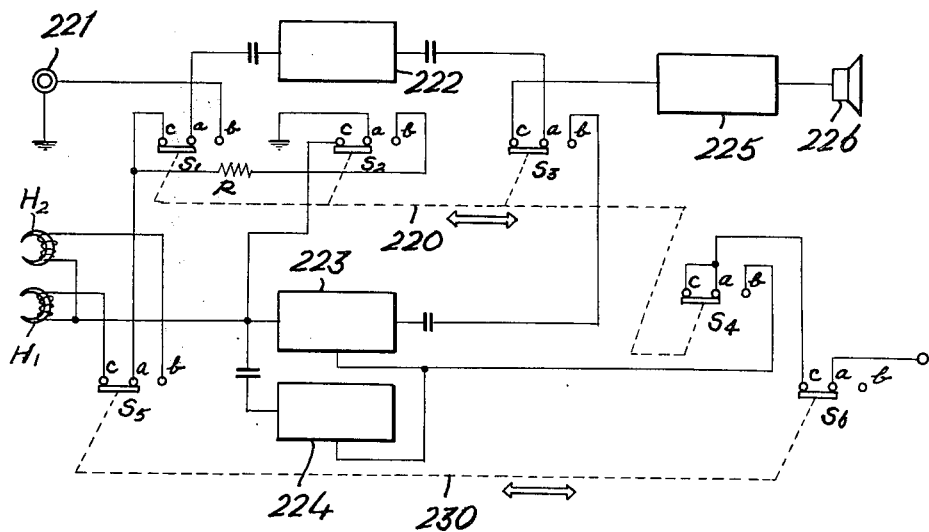
FIG. 13 is a diagram showing the circuit for preventing the duplicated recording.

FIG. 13 shows an electric circuit according to this invention for preventing the duplicate recording. According to this invention, as mentioned already a recording switch member 220 has been attached at the front of the recording lever 7, and a changing switch member 230 has been attached to the lower surface of the printed board 103. It will be clear that the recording switch member 220 receives the changing operation due to the recording lever 7 which has advanced, and the changing switch member 230 receives its changing operation being interlocked to the abovementioned changing operation of said tape-feed changing plate 6 that is caused to move by the engagement of the vertical piece 145 fastened by a screw 144 to the change control piece 143 with the engaging hole 65 of the tape-feed changing plate 6. An electric circuit setup concerning these switch members 220, 230 is shown in FIG. 13. On the circuit from the terminal 221 for connecting the recording microphone to the low-frequency amplifier 222 is provided a first changing switch $S_1$ for changing the recording operation and reproducing operation, and on the circuit from the low-frequency amplifier 222 via power amplifier 225 to the speaker 226 is provided a third changing switch $S_3$. On the head elements $H_1$, $H_2$ governing the first and the second channels is provided a fifth changing switch $S_5$. The fifth changing switch $S_5$ and said first switch $S_1$ are connected to a branch circuit having resistance R and are linked to the second changing switch $S_2$. The second changing switch $S_2$ is connected to the recording amplifier 223 and the recording bias oscillator 224 provided in parallel with the power circuit with respect to said head elements $H_1$, $H_2$. On the power circuit 231 connected to the amplifier 223 and the oscillator 224 are provided the fourth and sixth changing switches $S_4$ and $S_6$. The abovementioned first to sixth changing switches $S_2$–$S_6$ have $b$ contact on one side and $c$ contact on the other side with $a$ contact at the center. Changing operation of contact pieces is effected among these contacts $a$–$c$, and the first to ourth changing switches $S_1$–$S_4$ are incorporated in said recording switch system 220, and the fifth and the sixth changing switches $S_5$ and $S_6$ are incorporated in the changing switch system 230, and receives the changing operation from said recording lever 7 or tape-feed changing plate 6.

According to the above-mentioned setup shown in FIG. 13, if the recording switch system 220 is operated to close the contacts $a$ and $b$ of the switches $S_1$–$S_4$, the signals from the microphone connected to the connection terminal 221 are fed to the recording amplifier 223 through the low-frequency amplifier 222 and the switch $S_3$, On the other hand, since the power supply is connected to the recording bias oscillator 224 via the switch $S_4$, a bias signal is produced. And with the contacts of the switches $S_5$ and $S_6$ being closed across $a$ and $c$ due to the tape-feed changing plate 6 in such a manner that the magnetic tape of the cassette runs in the forward direction under the above-mentioned conditions, the output signals of the amplifiers 223 and 224 are fed to the head element $H_1$ of the first channel side, and the signals recovered from the amplifier 223 are recorded on the corresponding track of the magnetic tape.

If the magnetic tape is fed to its end, the tape-feed changing plate 6 is operated, causing the switches $S_5$ and $S_6$ to close their $a$ and $b$ contacts. By such a contact change, the head element $H_1$ is separated from the amplifier 223 and the oscillator 224, and the head element $H_2$ is connected, and at the same time, the running direction of the magnetic tape is reversed thereby continuing the running. But since the switch $S_6$ has contacts $a$ and $c$ which are open, the power supply to the amplifier 223 and to the oscillator 224 is opened. Accordingly, the signals introduced from the terminal 221 are not recorded on the magnetic tape, thus preventing duplicate recording. When the recorded signals are to be reproduced, the switches $S_1$–$S_4$ are changed to close contacts $a$ and $c$; the signals detected by the head elements $H_1$, $H_2$ are fed to the amplifier 222 through switches $S_5$ and $S_1$, and the signals amplified are fed to the power amplifier 225 through switch $S_3$ and converted into sound from the speaker 226. In short, according to the above-mentioned setup, the switches $S_4$ and $S_6$ which turn on or off the power circuit that energizes the recording bias oscillator 224 and the recording amplifier 223, are incorporated in the switch system 230 and the recording switch system 220 interlocked to the tape-feed direction reversing mechanism. And if the tape-feed direction is reversed under the condition where the recording switch system 220 is changed into the recording condition due to the recording lever 7, the switch $S_6$ is changed to automatically stop the recording, in order to avoid duplicate recording.

What is claimed is:

1. A tape recorder comprising a frame, a deck provided with a pair of reel drive shafts, a motor, means connecting said motor to selectively drive either one of said reel drive shafts, a cassette guide member having an opening for receiving the reproduce side of a cassette, a pivotally movable frame means including a pivot shaft and resilient plates pivotally attaching said cassette guide means to said deck for lowering the cassette guide member to a predetermined lower operative position and to raise it to an inoperative position, said pivotally movable frame having a protrusion, a head mounting plate provided with a recording and reproducing head and at least one pinch roller, a slide piece having a pin, means slidably mounting said slide piece on said deck; a suspending piece having a tip, means loosely pivoting said suspending piece at one end to said pivotally movable frame, a toggle spring hooked across the tip of said suspending piece and the pivot shaft of said pivotally movable frame, a locking lever, means pivotally attaching said locking lever to said frame, said slide piece having a guide hole that engages with the protrusion provided on said pivotally movable frame, a spring expanded between said locking lever and said pivotally movable frame and forming a locking part releasably engaging the pin of said slide piece and further having an engaging part that engages with said suspending piece, said suspending piece having a pair of downwardly extending protrusions engaging with the reproduce side and the step formed on said reproduce side of a cassette, said pivotally movable frame formed with a cut-out for receiving said downwardly extending protrusions, and further having a guide member engaging the tip of said suspending piece in said cut-out for guiding the motion of said suspending piece, and further having an upwardly tilted part in said cut-out for pushing-up said suspending piece when moved, said suspending piece further having a contact part which releasably engages with said tilted push-up part whereby when the cassette is being inserted, the reproduce side pushes the protrusion on one side of the suspending piece and then the contact part is released from the tilted push-up part, so that other protrusion of the suspending piece comes into contact with the step of the cassette, and under this condition the restoring action of the toggle spring in passing its dead point automatically pulls the cassette into the front opening.

2. A tape recorder according to claim 1 including an eject piece, springs expanded between said deck and the slide piece, means slidably attaching said eject piece to said slide piece, an engaging resilient piece being provided on said eject piece, said engaging resilient piece having a free-end positioned over said suspending piece and said free-end forming an opening, the wall of which forms front and back guides, another guide formed on the free end of said engaging resilient piece, said suspending piece having an engaging rod at the positions corresponding to said opening and guides, said pivotally movable frame having a push-up step which engages with said another guide, whereby when the eject operation is effected by pushing the eject piece, the wall of the opening in said engaging resilient piece proceeds and engages with the engaging rod of the suspending piece which has ascended to pull back said suspending piece by overcoming the resilient force of the toggle spring, and in the final step the push-up part of the moving frame acts to guide the horizontal protrusion of the engaging resilient pieces thereby causing said opening to be released from the engaging rod.

3. A tape recorder according to claim 2 including a slide plate on the deck, a hitting part provided at the tip of the eject piece to hit the slide plate mounted on the deck, a changing plate means for moving the head mounting plate having an engaging part which is a tip of the changing plate, and means pivotally attaching said changing plate with its end to the deck facing said hitting part, the center of the head mounting plate provided with said head, and means pivotally supporting said head including an engaging rod provided at the center of said changing plate, whereby when an eject operation is effected by means of the eject piece, the changing plate is operated by said hitting part to pull back said head and said at least one pinch roller on the head mounting plate.

4. A tape recorder according to claim 1 including a movable mounting plate means mounting a head, a spring expanded between the head mounting plate and the deck, spaced mounting shafts on the mounting plate, a support frame means mounting said pinch roller rotatably on each of said mounting shafts, spring means for moving the support frames so that the pinch rollers will be pushed out, a resilient plate having means fastening its end to the lower surface of the deck, a protrusion in the center of the resilient plate, a hole punched at the tip of said resilient plate, an engaging part formed on and bent downward at the tip of said hole, an engaging rod which releasably engages with said engaging part being provided at the lower surface and center of the head mounting plate, an engaging face being formed on said engaging rod, whereby under the condition in which the cassette is not positioned in the reproducing position, said engaging rod protrudes beyond the head mounting plate due to the resilient force of the resilient plate, the engaging face of the engaging rod thereby engaging with the engaging part of said resilient plate to maintain said head mounting plate, head and pinch rollers in retracted position, said protrusion being pushed down by a cassette loaded on said pivotally movable frame due to the lower side of the cassette which has lowered down causing the engaging part of said resilient plate to be released from the engaging face of the engaging rod, the head mounting place being thus pulled forward, said engaging rod thereby riding on the upper surface of said resilient plate, and the head and the pinch roller on the head mounting plate being moved to press against the tape of the cassette.

5. A tape recorder according to claim 4 wherein a guide is formed on the head mounting plate, a spring expanded across said guide and the deck, a control projection provided on each side of said deck, a pair of capstan shafts each having a flywheel, a change control member have engaging projections on opposite sides thereof and means pivotally attaching said change control member to said deck, a brake control piece having a control protrusion, said control projections being engageable with the protrusion on the brake control piece for braking each of the two drive rotors of the reel shafts and one of the two flywheels on the capstan shafts, a U-shaped resilient member cooperating with the change control piece to retain it in neutral position, said change control piece having first and second rotors that releasably engage with said drive rotors and flywheels, a guide plate slidably mounted on the deck, rods provided on both sides and lower surface of said guide plate, one of said engaging projections being engageable with said rods and having a spring which operates to pull the guide forward, engaging projections provided at the tip of said guide plate being engageable with said head mounting plate, whereby the fast feeding and winding back of the tape in the cassette is effected by converting the engagement of said first and second rotors with the flywheels and the rotors by operation of said change control member, the head mounting plate being moved rearwardly via the guide plate by the engaging projections on both sides of the change control member, the head and pinch roller mounted on said head mounting plate being released from the pressing condition against the tape of the cassette.

6. A tape recorder according to claim 4, wherein said deck is provided with a recording lever and a tape-feed changing member, a locking member provided between said recording lever and said tape-feed changing member, a cam engageable with said pinch roller, a tilted guide that releasably engages with said lock member being formed on said tape-feed changing member, a locking part that releasably engages with the locking member being formed on said recording lever, an engaging part that engages with the head mounting plate together with said tilted guide being formed on one side of said locking member, and another engaging part that engages with said locking part being formed on the other side of said locking member, whereby the recording lever is locked when the tape is being reproduced or wound back.

7. A tape recorder according to claim 6 including an interlocked switch, a recording switch, selection switches, a power supply, bias oscillator and recording amplifier, said tape-feed changing member being engageable with said interlocked switch, circuit means linking said interlocked switch, recording switch power supply, bias oscillator and recording amplifier whereby the power supply is fed to said bias oscillator and to the recording amplifier only when the tape is running in the forward direction and only during the recording condition.

8. A tape recorder according to claim 1 wherein said deck has a tape-feed changing means slidably mounted thereon, said slide piece provided with a change control member, said tape-feed changing means being formed with a tilted end engageable with each change control member, whereby operation of said slide piece to effect eject under the condition in which the tape-feed changing means is moved in one direction and said tilted end protrudes onto the change controlling member, said tape-feed changing means is pushed back toward the opposite direction, so that the tape can start running invariably in the desired direction.

9. A tape recorder according to claim 1 including a cassette loading port formed in the frame, a dust-tight door and means mounting said door on the frame normally biased to close the loading port, a pulling member provided between the eject piece attached to said slide piece and the dust-tight door whereby when an eject operation is being effected, said dust-tight door is opened and then the cassette which has been in the reproducing position is pulled up.

* * * * *